June 15, 1926.
S. J. CLULEE
SPECTACLE FRAME
Filed July 25, 1921
1,589,051
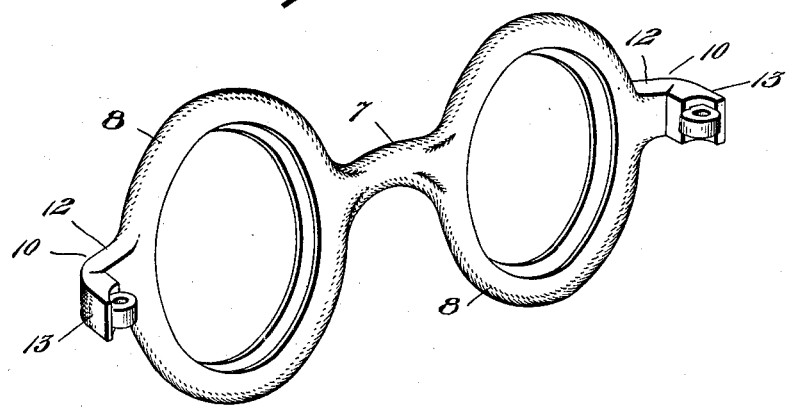
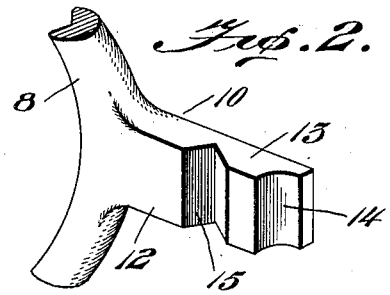
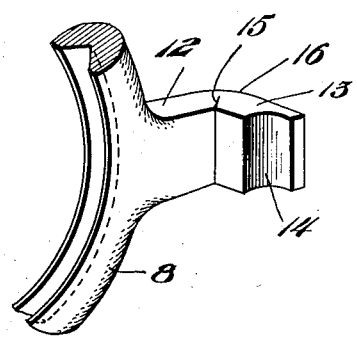
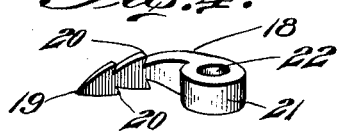
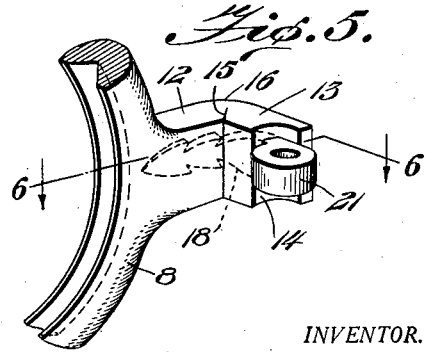
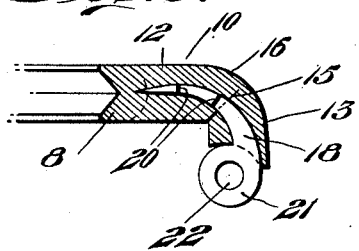
INVENTOR.
Stephen J. Clulee
BY Horatio E. Bellows
ATTORNEY Patented June 15, 1926.

1,589,051

UNITED STATES PATENT OFFICE.

STEPHEN J. CLULEE, OF ATTLEBORO, MASSACHUSETTS, ASSIGNOR TO BAY STATE OPTICAL COMPANY, A CORPORATION OF MAINE.

SPECTACLE FRAME.

Application filed July 25, 1921. Serial No. 487,305.

My invention relates to frames or bows constructed of celluloid, xylonite or other nonmetallic material, and is directed to the temple carrier portions thereof.

It is well known that in this type of frames the material is such that the necessary original curvature or bend of the carriers is destroyed when the frame is subjected to the degree of heat necessary for permitting the insertion of lenses in the bows; and that when repairs or adjustments are later made the optician's pliers are liable to accidentally strain or break off the curved carrier.

The essential objects of my invention are to overcome these disadvantages; to strengthen the carriers; and to attain these ends in a structure which combines therewith a constituent part of the temple pivoting means.

To the above ends essentially my invention consists in such parts and in such combinations of parts and in such steps as fall within the scope of the appended claims.

In the accompanying drawings which form a part of this specification,

Figure 1 is a rear perspective view of a spectacle frame embodying my invention, Figure 2, a perspective of a frame end after notching, Figure 3, a like view of the same after bending, Figure 4, a detail view of the auxiliary member, Figure 5, a perspective view of a completed frame end, and Figure 6, a section on line 6—6 of Figure 5.

Like characters of reference indicate like parts throughout the views.

The structure consists of a nonmetallic frame of celluloid or other material possessing similar characteristics, and comprises a bridge 7, rims 8, and carriers indicated generally by 10. In detail each member 10 consists of a flat horizontal portion 12 and a rearwardly directed terminal portion 13.

To construct my device, the initial straight or unbent blank intended to form the ultimate carrier, as shown in Figure 2, has the end face cut to form a vertically disposed hinge groove 14. Intermediate its length the member 10 has cut transversely of its rear face a groove 15, V shaped in cross section.

The portion 10 is next rendered pliable by heat or otherwise, and the portion 13 is folded rearwardly bringing the faces of the groove together forming a right angular curved bend 16 between the portions 12 and 13, as shown in Figure 3.

There is provided a metallic member, shown in Figure 4, comprising a longitudinally curved flat shank 18 tapering to a point 19 and provided upon its lateral edges with rearwardly directed serrations 20. Integral with the outer end of the shank is a cylindrical hinge ring 21 whose bore 22 is to accommodate the pintle adapted to enter the hinge rings or lugs of the temple member.

Midway the length of the groove 14 the shank 18 is driven into the bent frame end passing through the portion 13 and into the portion 12 across the seam 15 while the periphery of the head 21 is seated in the groove 14. The member 18 insures a permanent positioning of the carrier portions 12 and 13 relatively to each other regardless of subsequent heating or other treatment of the material thereof or adjacent thereto, and the serrations 20 assist in retaining the member 18 against withdrawal.

I claim:

1. In a nonmetallic spectacle frame, rims, carriers on the rims provided with intermediate bends and with transverse seams in the bends, and metallic members comprising longitudinally bent shanks in the carriers extending across the seams, and rings on the shanks exterior of the carriers.

2. The process of forming a nonmetallic spectacle frame consisting in forming the frame with a straight projecting block upon its end, next forming in an intermediate portion of its rear face a transversely disposed V shaped groove, next reducing the block to a pliable condition and bending the outer end thereof rearwardly to close the groove and form a resultant seam, and finally driving through the end portion of the block across the seam and into the opposite portion of the block a metallic shank carrying a terminal ring.

3. In eyeglass construction, in combination, a non-metallic rim member having a part projecting outwardly from the side thereof and curved rearwardly, and a metal member having a hinge portion positioned rearwardly of the rear end of said part for connecting a temple bar and secured to said part by a shank portion extending into said part from said rear end thereof and substantially completely embedded therein.

4. In eyeglass construction, in combination, a non-metallic rim member having a part projecting outwardly from the side thereof and curved rearwardly, and a metal member having a hinge portion positioned rearwardly of the rear end of said part for connecting a temple bar and secured to said part by a shank portion extending into said part from said rear end thereof and substantially completely embedded therein, said shank portion being curved substantially to the contour of said non-metallic part in which it is embedded.

5. In eyeglass construction, in combination, a non-metallic rim member having a part projecting outwardly from the side thereof and curved rearwardly, said part having therein a transverse seam adjacent the curve, and a metal member having a portion adjacent the rear end of said part for connecting a temple bar and a portion embedded in said part, said last portion extending forwardly along said part to a point forwardly of said seam.

6. In eyeglass construction, in combination, a rim member having a non-metallic carrier extending therefrom and bent rearwardly, said carrier having therein a transverse seam adjacent said bend, and metallic means secured to said carrier and extending across said seam.

7. In eyeglass construction, in combination, a rim member having a non-metallic carrier extending therefrom and bent rearwardly, said carrier having therein a transverse seam adjacent said bend, and a metallic member having a part embedded in said carrier and extending across said seam and a part projecting rearwardly of said carrier for connecting a temple bar thereto.

8. In eyeglass construction, in combination, a non-metallic rim member having a part projecting outwardly from the side thereof and curved rearwardly, and a metal member comprising a shank portion embedded in said projecting part and a portion extending outwardly from the rear end thereof for attaching a temple bar, said shank portion having an irregular edge interlocking with the non-metallic material in which it is embedded to resist rearward withdrawal of said metal member.

9. The herein described art of forming a non-metallic spectacle frame consisting in forming the frame with a straight projecting block, forming in an intermediate portion of the rear face of said block a transversely disposed groove, reducing the block to a pliable condition and bending the outer end thereof rearwardly to close the groove and form a resultant seam.

10. In eyeglass construction, in combination, a rim member having a non-metallic carrier extending therefrom and bent rearwardly, said carrier having on its inner side a portion of the material thereof removed to facilitate said bending and forming a seam, and a metal member having a part shaped substantially to the contour of said carrier and embedded therein extending across said seam as a reenforcement, and another part projecting from said carrier for attaching a temple bar thereto.

11. In eyeglass construction, in combination, a non-metallic rim member having a part projecting from the side thereof and curved rearwardly, and a metal member comprising a shank portion embedded in said projecting part and a portion extending outwardly from the rear end thereof for attaching a temple bar, said shank portion being curved to a contour approximating that of said curved part in which it is embedded and having an irregular edge interlocking with the non-metallic material to resist rearward withdrawal of said metal member.

12. In eyeglass construction, in combination, a non-metallic rim member having a part projecting outwardly from the side thereof and curved rearwardly, and metal member comprising a shank portion embedded in said projecting part and a portion extending outwardly from the rear end thereof for attaching a temple bar, said shank portion having an irregular edge interlocking with the non-metallic material in which it is embedded to resist rearward withdrawal of said metal member, the forward end of said shank portion being pointed.

13. The herein described art of forming a non-metallic spectacle frame which consists in forming the frame with a straight projecting block, forming in an intermediate portion of the rear face of said block a transversely disposed groove, bending the outer end of the block rearwardly to close the groove, and thereupon inserting into said block from the rear end thereof a metal reinforcing member.

14. In eyeglass construction, in combination, a non-metallic rim member having a carrier portion extending outwardly therefrom, said carrier having a portion of the material thereof cut away at an intermediate point in its side surface and being bent rearwardly so that said cut is closed.

In testimony whereof I have affixed my signature.

STEPHEN J. CLULEE.